(12) United States Patent
Aqel

(10) Patent No.: US 11,773,017 B1
(45) Date of Patent: Oct. 3, 2023

(54) POLLUTED $CO_2$ CAPTURING WITH LIME PRODUCED FROM PHOSPHOGYPSUM CALCINATION USING SULFUR AS NON-$CO_2$ FUEL

(71) Applicant: Saudi Arabian Mining Company (Ma'aden), Riyadh (SA)

(72) Inventor: Malik Mohammad Odeh Aqel, Amman (JO)

(73) Assignee: SAUDI ARABIAN MINING COMPANY (MA'ADEN), Riyadh (SA)

( * ) Notice: Subject to any disclaimer, the term of this patent is extended or adjusted under 35 U.S.C. 154(b) by 0 days.

(21) Appl. No.: 17/707,144

(22) Filed: Mar. 29, 2022

(30) Foreign Application Priority Data

Mar. 28, 2022 (EP) .................................... 22164736

(51) Int. Cl.
| | |
|---|---|
| C04B 7/36 | (2006.01) |
| C04B 11/02 | (2006.01) |
| C04B 11/26 | (2006.01) |
| C04B 11/028 | (2006.01) |
| C04B 111/00 | (2006.01) |

(52) U.S. Cl.
CPC .............. C04B 7/367 (2013.01); C04B 7/365 (2013.01); C04B 11/0283 (2013.01); C04B 11/26 (2013.01); C04B 2111/00017 (2013.01)

(58) Field of Classification Search
None
See application file for complete search history.

(56) References Cited

U.S. PATENT DOCUMENTS

| 4,312,842 A | 1/1982 | Wilson, Sr. et al. |
| 2013/0288887 A1 | 10/2013 | Wu et al. |

FOREIGN PATENT DOCUMENTS

| CN | 107774114 A | 3/2018 |
| CN | 112142350 A | 12/2020 |
| FR | 3108859 A1 | 7/2022 |

OTHER PUBLICATIONS

T.D. Wheelock and D.R. Bolan, "Reductive Decomposition of Gypsum by Carbon Monoxide", Journal, Mar. 1960, 215-218, vol. 52, No. 3, Industrial and Engineering Chemistry.
W.M. Swift, A.F. Panek, G.W. Smith, G.J. Vogel, and A.A. Jonke, Decomposition of Calcium Sulfate: A Review of the Literature, Report, Dec. 1976, 1-55, ANL-76-122, Argonne National Laboratory Chemical Engineering Division.
(Continued)

*Primary Examiner* — Daniel Berns
(74) *Attorney, Agent, or Firm* — Hayes Soloway P.C.

(57) ABSTRACT

A new integrated method to capture polluted $CO_2$ using CaO produced from phosphogypsum calcination using sulfur as non-$CO_2$ fuel where (1) both pollutants of phosphogypsum and $CO_2$ are transformed into environmentally neutral or useful products such as limestone or clinker and sulfuric acid; (2) low-$CO_2$ CaO produced from calcination of phosphogypsum with sulfur as fuel can be used to produce low-$CO_2$ clinker that replaces the use of high-$CO_2$ limestone as raw material; (3) the use of sulfur as fuel to calcine phosphogypsum allows the production of low-cost sulfuric acid.

20 Claims, 1 Drawing Sheet

(56) References Cited

OTHER PUBLICATIONS

Fang Fan, Li Zhen-Shan, and Cai Ning-Sheng, "Experimental Research and Modeling of Multiple Carbonation/Calcination Cycle of Ca-Based CO2 Sorbents", Journal, May 15, 2009, 30-35, vol. 29, No. 14, China Society for Electrical Engineering.

Siqi Zhao, Liping Ma, Dongdong Wang, Jie Yang, Yuhui Peng, and Lichun Wang, "Sulfur-Looping Mechanism for the Two-Step Cyclic Process of Fluidized-Bed CO2 Capture and Phosphogypsum Thermal Decomposition Assisted by H2S", Article, 12582-12593, Nov. 16, 2017, vol. 31, No. 11, Energy & Fuels.

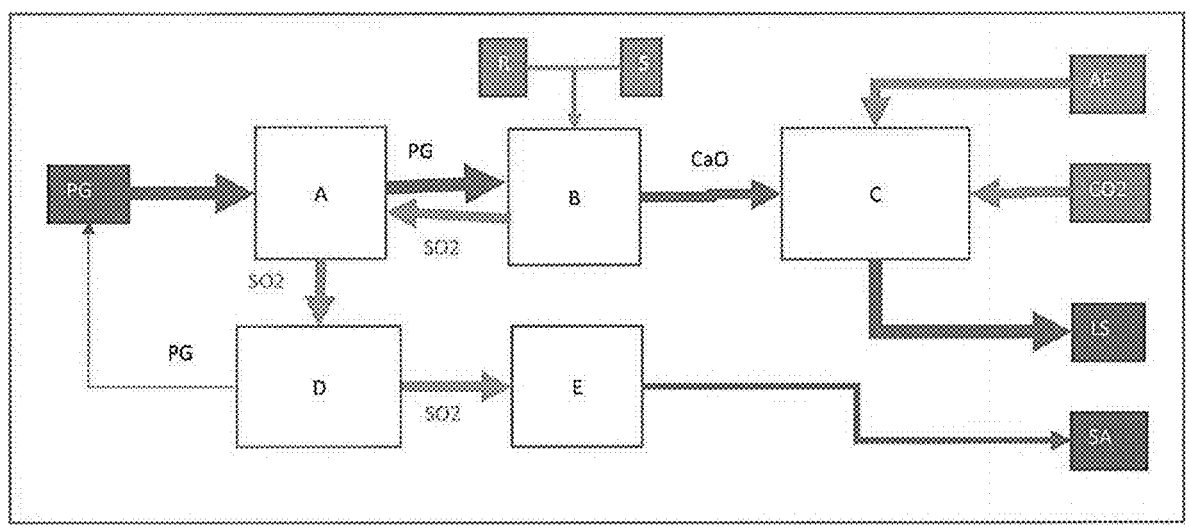

POLLUTED CO₂ CAPTURING WITH LIME PRODUCED FROM PHOSPHOGYPSUM CALCINATION USING SULFUR AS NON-CO₂ FUEL

CROSS-REFERENCE TO RELATED APPLICATIONS AND PRIORITY

This patent application claims priority from European Patent Application No. 22164736.5 filed Mar. 28, 2022. This patent application is herein incorporated by reference in its entirety.

TECHNICAL FIELD

The present invention relates to capturing polluted $CO_2$ with CaO produced from phosphogypsum calcination using sulfur as non-$CO_2$ Fuel.

BACKGROUND OF THE INVENTION

Significant quantities of phosphogypsum and carbon dioxide ($CO_2$) waste are produced every year. Phosphogypsum (PG) disposal represents a special challenge, requiring significant investments to prepare new containment area every 5 to 7 years of operations and limiting the expansion of phosphoric acid production due to limitation in gypsum disposal areas. In addition, high calcium content in the phosphate concentrate requires higher consumption of sulfuric acid (SA), which increases sulfur consumption and costs.

Ammonia operations expansion also presents challenges by increasing $CO_2$ emissions with potential penalties and potential downgrading of products due to being non-green and by missing the increasing market opportunity to supply blue ammonia or low CO2 ammonia. $CO_2$ production can be divided in two categories: clean $CO_2$, which is suitable for use in products like urea and methanol, and polluted $CO_2$, from combustion exhaust gases or phosphoric acid production of acidic fumes, which are not suitable for use as is.

Traditional technologies have approached the phosphogypsum thermal treatment to produce various building materials including: (1) neutralization with lime (CaO) and drying then it is added to clinker and milled together to produce Portland cement; (2) pre-calcination of phosphogypsum to produce alfa hemi-hydrate gypsum (α-HH); and (3) the use of washed/treated phosphogypsum as source of CaO in the raw meal with carbon, silica and ferrous to produce clinker in extended drying, calcination and clinkering in an energy intensive extended kiln plants. It is noted that the energy consumption to produce clinker in this method can consume up to 200% of the energy consumed in traditional clinker production process from limestone.

Traditional key technologies related to calcination of phosphogypsum and formation of limestone, typically include: (1) energy intensive phosphogypsum calcination into calcium oxide (CaO) and sulfur dioxide ($SO_2$), which is well known in the previous art [1, 2]; (2) sulfuric acid production from $SO_2$ rich gases, which is well established in applications including zinc, copper, and iron smelters' exhaust gases treatment, as well as the exhaust gases treatment from phosphogypsum calcination. However, the use of sulfur or sulfur-rich fuel in the calcination is considered a disadvantage because of higher concentration of $SO_2$ in exhaust gases due to excessive quantities of SA that is produced.

Traditional key technologies related to $CO_2$ capturing and storage or utilization, typically include: (1) capturing and injection to enhance oil recovery, in place of steam or water injection in old wells; (2) purification and consumption in the production of chemicals like methanol, urea and polymers; (3) injection into microalgae reservoir as a source of $CO_2$ for photosynthesis to increase their growth; (4) purification for use a food grade $CO_2$ in beverages and dry-ice applications; (5) $CO_2$ capturing with CaO in flue gases to produce byproduct limestone (LS) as exemplified in ref. [3] and U.S. Pat. No. 2,773,080 CA. An extended description of the Circular Fluid-Bed reactor (CFB) to capture $CO_2$ with CaO is exemplified in ref. [1].

The problem with producing CaO is usually associated with limestone ($CaCO_3$) calcination with hydrocarbon fuel, which generates approximately 200% excess $CO_2$ from both fuel and $CaCO_3$, compared to the amount of $CO_2$ that would be captured by CaO.

The use of hydrocarbon fuel to calcine phosphogypsum also generates significant quantity of $CO_2$ that cannot justify the reuse of CaO produced for $CO_2$ capturing.

The foregoing issues signal the need for a method that overcomes the limitations of traditional processes and avoids restrictions in applicability to multiple raw material, while reducing materials waste and providing cost advantages with a net reduction of $CO_2$ emissions.

SUMMARY OF THE EMBODIMENTS

In certain embodiments, the present invention provides an alternative integrated method to utilize the main waste streams from phosphate and ammonia operations, comprising phosphogypsum and $CO_2$ to both reduce their footprint and to produce commercial products.

In one aspect, the invention is directed at a novel integrated process that captures the $CO_2$ produced from ammonia and phosphate processing operations, comprising hydrocarbon fuels (HC) combustion and calcareous phosphate rock digestion in a phosphoric acid plant (PAP), with acidic fumes and $CO_2$ emissions. The recycled $CO_2$ is then captured by CaO produced from phosphogypsum calcination to obtain limestone, with significant heat recovery from the reaction of $CO_2$ and CaO. This novel approach allows converting calcium from phosphate rock (PR), currently disposed as waste phosphogypsum, to useful building material like limestone.

In certain embodiments, disclosed herein is a method featuring capturing high $CO_2$ acidic off-gases produced in the digestion of low-grade calcareous phosphate ore with sulfuric acid (SA) in the known wet phosphoric acid process (WPA) to produce phosphoric acid and phosphogypsum.

The integrated process disclosed herein is both unique and novel in nature that reduces the waste $CO_2$ and phosphogypsum and provides cost advantages by:

(1) using CaO from the PG to capture $CO_2$ and fix it in $CaCO_3$ form on a permanent basis, (2) reducing the consumption of sulfur by the sulfuric acid regeneration from phosphogypsum and reduce the accumulation of waste PG during the phosphate processing to produce phosphoric acid from phosphate rock, (3) reducing the consumption of hydrocarbon fuel in the calcination of phosphogypsum.

(4) allowing net reduction of $CO_2$ emission from phosphate and ammonia operations and avoiding penalties related to $CO_2$ emissions.

BRIEF DESCRIPTION OF THE FIGURES

The invention can be better understood with reference to the following figure and description.

FIG. 1 illustrates the method for capturing polluted $CO_2$ with CaO produced from phosphogypsum calcination using sulfur as non-$CO_2$ fuel as a block diagram.

DETAILED DESCRIPTION OF SPECIFIC EMBODIMENTS

The present invention provides an integrated method to capture $CO_2$ with CaO produced from phosphogypsum calcination using sulfur as non-$CO_2$ fuel.

In certain embodiments exhaust gases are flown in counter current to a PG calcination plant (block B) and from the phosphogypsum calcination plant to a drying plant (block A), where phosphogypsum is initially fed from dry stack at a moisture level of 10-40%.

In a preferred embodiment, the phosphogypsum from dry stack is fed at a moisture level of 20-30%.

In certain embodiments, the counter current flow of gases and solids comprises the following steps: (1) sulfur burning; (2) phosphogypsum calcination; (3) phosphogypsum pre-calcination; and (4) phosphogypsum drying.

In one embodiment, sulfur burning: $S+O_2=SO_2$ is conducted at an approximate temperature range of approximately 1100-1400° C.

In a preferred embodiment, sulfur burning, is conducted at an approximate temperature range of 1200-1300° C.

In another embodiment, (2) heat is applied at an approximate temperature range of 1100-1500° C. for phosphogypsum ($CaSO_4$) calcination.

In a preferred embodiment, heat is applied at an approximate temperature range of 1200-1400° C. for phosphogypsum ($CaSO_4$) calcination.

In one embodiment, pre-calcination of phosphogypsum, is described by the following reaction: $CaSO_4 \cdot 2H_2O$ +heat=$CaSO_4+2H_2O(v)$; where heat is applied at an approximate temperature range of In a preferred embodiment, heat is applied at an approximate temperature range of 700-900° C. to reaction pre-calcination of phosphogypsum.

In one embodiment, (4) drying of fee moisture, is described as follows: $H_2O(l)$+heat=$H_2O(v)$; where heat is applied at an approximate temperature range of 300-700° C.;

In a preferred embodiment, heat is applied at an approximate temperature range of 400-600° C. to dry the fee moisture.

In one embodiment, temperature of gases must be controlled above 300° C. to avoid condensation produced in steps (1) to (4), where excess $SO_2$ is reacted with $H_2O$ to obtain $H_2SO_3$, as described by the following reaction: $SO_2+H_2O=H_2SO_3$ at an approximate temperature of less than 250° C.

In certain embodiments, $SO_2$-rich stream produced from drying phosphogypsum in block A is partially washed with $Ca(OH)_2$ solution to treat the waste gas stream as described by the following reactions: $2Ca(OH)_2+2SO_2+O_2=2CaSO_4+H_2O$+heat, and $Ca(OH)_2+2CO=CaCO_3+C+H_2O$+heat. The waste gas stream is then cooled to less than 450° C. in block D, before feeding $SO_2$ to a waste gas sulfuric acid plant (WG-SAP) in block E.

In a preferred embodiment, the waste gas stream described above is then cooled to an approximate temperature range of 350 to 400° C. in block D, before feeding $SO_2$ to a waste gas sulfuric acid plant (WG-SAP) in block E.

In certain embodiments, sulfur utilized as the main source of fuel with air and a carbon source used as reducing agent, for phosphogypsum calcination in block B, and the decomposed phosphogypsum $SO_2$, together generate a gas stream at an approximate concentration range of 16-20% $SO_2$ by weight. This concentration is similar to the SO2 concentration produced by direct sulfur burning in conventional sulfuric acid plant (SAP), where this high concentration stream is diluted to approximately concentration of 10-12% before feeding to an SO2/SO3 converter operating according to reactions: $2SO_2+O_2=2SO_3$+heat; where temperature is controlled at an approximate range of 400-450° C.; then sulfuric acid is produced by $SO_3$ absorption with water according to reaction: $SO_3+H_2O=H_2SO_4$+heat; where temperature is controlled at an approximate range of 80-160° C.

In a preferred embodiment, the $SO_2$-rich gas stream has an approximate concentration range of 13-25% $SO_2$ by weight.

In a preferred embodiment, the reaction $2SO_2+O_2=2SO_3$+heat is controlled at an approximate temperature range of 350 to 500° C.

In a preferred embodiment, the reaction $SO_3+H_2O=H_2SO_4$+heat is controlled at an approximate temperature range of 75 to 165° C.

In certain embodiments, conventional SAP can use the $SO_2$ gas stream coming from described phosphogypsum calcination with sulfur as fuel. In contrast, where conventional hydrocarbon fuel is used to calcine the phosphogypsum, the $SO_2$ concentration that is produced is below 10%, which can impact significantly the capacity of the existing SAP as well as the concentration of product sulfuric acid.

In certain embodiments, concentrated sulfuric acid produced in the waste gas sulfuric acid plant is utilized for digesting phosphate rock to obtain phosphoric acid and byproduct phosphogypsum.

In certain embodiments, byproduct phosphogypsum can be used directly or stacked for drying prior to feeding to block A.

In certain embodiments, CaO powder produced in the calcination plant is reacted with $CO_2$ in a circular fluid bed reactor to obtain $CaCO_3$, according to the reaction: $CaO+CO_2=CaCO_3$+heat; where reaction is applied at a temperature below approximately 650° C.

In a preferred embodiment, reaction $CaO+CO_2=CaCO_3$+heat is controlled at an approximate temperature below 600° C.

In a most preferred embodiment, reaction $CaO+CO_2=CaCO_3$+heat is controlled at an approximate temperature below 400° C.

In certain embodiments, $CO_2$ utilized in the circular fluid bed reactor is produced from acidic fumes from a source selected from the group consisting of a phosphoric acid plant, hydrocarbon fuel combustion, and hydrogen reformers.

In certain embodiments, CaO powder is utilized to precipitate acid fumes from phosphogypsum calcination, as described in reactions (x), (xi), and (xii):

(x) $CaO+H_3PO_4 = CaHPO_4+H_2O$;

(xi) $CaO + 2HF = CaF_2+H_2O$;

(xii) $CaO+H_2SiF_6 = CaSiF_6+H_2O$.

Material and Methods

A method is disclosed, with reference to FIG. 1, where polluted $CO_2$ is captured with CaO that is produced from phosphogypsum calcination using sulfur as a non-$CO_2$ fuel.

The method comprises the following operations:

PG from dry stack, normally at moisture level of 15-30%, is fed for drying in block A and calcination in block B in counter-current to sulfur fuel and exhaust gases to achieve better energy recovery and reduce the temperature of the exhaust $SO_2$-rich stream. Counter current flow of gases and solids follow the sequence: (1) sulfur burning, (2) phosphogypsum calcination, (3) phosphogypsum pre-calcination and (4) phosphogypsum drying. Described herein are the corresponding reactions:

1. Sulfur Burning: $S+O_2=SO_2$ (T=1200–1300° C.);
2. $CaSO_4$ calcination: $2CaSO_4+C+heat=2CaO+2SO_2+CO_2$ (T=1100–1300° C.);
3. Pre-calcination of PG: $CaSO_4 \cdot 2H_2O+heat=CaSO_4+2H_2O(v)$ (T=700–900° C.);
4. Drying of Fee moisture: $H_2O(l)+heat=H_2O(v)$ (T=400–600° C.).

Crystalline and free water are removed in reactions (3) and (4) respectively.

Removal of crystalline and free water in reactions (3) and (4) respectively, is utilized for cooling the $SO_2$ flue gases below approximately 700° C.

Moreover, gases temperature must be maintained above 300° C. to avoid $SO_2$ condensation, where $SO_2$ is reacted with $H_2O$ to produce $H_2SO_3$ as described by the following reaction:

5. $SO_2+H_2O=H_2SO_3(l)$ (T<250° C.).

$SO_2$-rich stream after drying the PG in (block A), is partially treated and further cooled in block D, using milk of lime $(Ca(OH)_2)$ washing prior to feeding to waste gas sulfuric acid plant (WG-SAP) in block E, as exemplified by the following reactions:

6. $2Ca(OH)_2+2SO_2+O_2=2CaSO_4+H_2O+heat$;
7. $Ca(OH)_2+2CO=CaCO_3+C+H_2O+heat$.

The use of sulfur (S) as main fuel in block B, together with a C-source as reducing agent (R), allows the $SO_2$-rich gas to be highly concentrated in $SO_2$, in the range of 16-20%, comparable to conventional SAP based on burning S. This reaction allows the direct implementation on existing SAP plants prior to the $SO_2$ to $SO_3$ conversion stage, which operates at $SO_2$ concentrations above 10-12%, as described herein:

8. $2SO_2+O_2=2SO_3+Heat$ (T=400–450° C.);
9. $SO_3+CO_2+H_2O=H_2SO_4+CO_2+Heat$ (T=80–160° C.).

SA produced from WG-SAP in block E is usually used to digest phosphate rock (PR) and produce Phosphoric Acid (PA) and byproduct phosphogypsum that is stacked and re-introduced to block A. This step allows to minimize the amount of phosphogypsum build up in phosphate operations.

CaO powder from block B is sent to a Circular Fluid Bed Reactor (CFBR) in block C where CaO is reacted with $CO_2$ produced by other sources, comprising: acidic fumes with $CO_2$ from PAP, hydrocarbon fuel combustion $CO_2$, and pure $CO_2$ from hydrogen reformers. Solid limestone (LS) is produced in powder form containing some of the impurities coming originally from the PG, as described by the following reaction:

10. $CaO+CO_2=CaCO_3+Heat$ (T<600° C.).

CaO powder attacks remaining acids fumes coming from phosphogypsum calcination and captures $CO_2$ stream from PAP operations with all other harmful fumes, as described by the following reactions:

11. $CaO+H_3PO_4=CaHPO_4+H_2O$;
12. $CaO+2HF=CaF_2+H_2O$;
13. $CaO+H_2SiF_6=CaSiF_6+H_2O$.

The present invention proposes an integrated method to achieve the following key advantages: (i) utilizing recycled phosphogypsum and avoiding the large-scale phosphogypsum stacks that are known environmental concern in the phosphate processing industry; (ii) using calcium from phosphate ores to capture $CO_2$ emitted from different sources of $CO_2$. This is achieved by converting the calcium in phosphate to phosphogypsum and then to lime, which is then used to capture $CO_2$, which in-turn produces LS, a known safe building material; (iii) increasing the SA production linked to the production of phosphoric acid (PA) from phosphate rock digestion with SA that produces phosphogypsum, which is in turn calcined with S as fuel. Excess SA production can be utilized to increase PA production or the production of other SA derivatives; (iv) reducing the need for equivalent hydrocarbon fuel source to conduct the PG calcination by using S as fuel, thereby reducing the total S required to for SA production. The total consumption of sulfur in SAP production is reduced to 50-60% of conventional SAP based on sulfur burning alone; (v) capturing of acidic fumes (AF) in various forms produced in PAP operations by utilizing CaO, a known sorbent for various acidic fumes, comprising: (AF) like; hydrofluoric acid (HF), hydroiodic acid (HI), fluorosilicic acid (FSA) as well as $CO_2$, to make; calcium fluoride $(CaF_2)$, calcium iodate $(CaI_2)$, and calcium hexafluorosilicate $(CaSiF_6)$, respectively; (vi) neutralizing various acids derived from phosphogypsum processing with CaO, including, for example: SA, PA, and FSA in stable form, to obtain $CaSO_4$, dicalcium phosphate $(CaHPO_4)$ and calcium fluosilicate $(CaSiF_6)$, respectively. LS and the calcium compounds described above are considered stable and environmentally friendly; (vii) generating energy in excess of that produced by the integrated method of the present invention by using sulfur as a fuel to calcine the phosphogypsum and produce SA and capture $CO_2$ in limestone: (1) 75% of energy recovered sulfur burning in conventional SAP; (2) when phosphogypsum is used to produce clinker, using sulfur as fuel to calcine phosphogypsum to CaO saves 40-50% of the total energy required to produce clinker from phosphogypsum when only hydrocarbon fuels are used. On the other hand, using sulfur as fuel will reduce clinker production's net $CO_2$ emissions by 75%, compared to conventional limestone-based clinker plants.

As used herein, the term "phosphogypsum" is defined to mean is a by-product from the production of phosphoric acid by treating phosphate ore with sulfuric acid and producing gypsum $(CaSO_4 \cdot 2H_2O)$.

As used herein, the term "precipitating acid fumes" refers to reacting acidic components in fumes with a base, thereby trapping the acid in the form of a salt.

Prophetic Example

Most of the technology identified and utilized by the new integrated process concept in this invention are well proven and have been demonstrated commercially.

Sulfur use as fuel in the calcination of phosphogypsum is not recognized in previous arts and is considered a key novelty of the present invention. On the other hand, gypsum calcination with other fuels is well demonstrated [1]. Also, the burning of sulfur for SAP plants is well established on large scale.

$CO_2$ capturing by CaO in a circular fluid bed reactor (CFBR) is required to be scaled up for large application as we are evaluating to use in the integrated concept in this invention [4, 5].

To demonstrate the total energy and mass balance for the integrated concept in this invention (A) versus; (B) conventional SA production from sulfur burning and (C) the use of methane as fuel for phosphogypsum calcination, (D) the calcination of limestone to produce lime (in clinker's pre-heater and calcination), the following table summarize the Ins and Outs for two case studies:

| Case | Sulfur Ktpy | $CH_4$ ktpy | PG ktpy | $CO_2$ ktpy | LS ktpy | SA ktpy | Net Heat kjy |
|---|---|---|---|---|---|---|---|
| A IN (Invention) | 845 | 109 | 6,000 | 900 | | | |
| A OUT (Invention) | | | | 2,750 | | 5,225 | −6.0 |
| B IN (Conventional SAP) | 858 | | | | | | |
| B OUT (Conventional SAP) | | | | | | 2,575 | −8.0 |
| C IN (PG calcination with NG) | 0 | 265 | 6,000 | 430 | | | |
| C OUT (PG calcination with NG) | | | | 2,750 | | 2,650 | −5.0 |
| D IN (LS calcination with NG in clinker plants) | 0 | 120 | | | 2,750 | | |
| D OUT (LS calcination with NG in clinker plants) | | | | 1,540 | | 0 | 0.0 | the use of hydrocarbon fuel will reduce the amount of net $CO_2$ that can be captured from other sources by 50%, compared to the use of sulfur as fuel.

the use of sulfur as fuel to caline phosphogypsum increases the sulfuric acid production and reduces the specific consumption of sulfur to produce sulfuric acid by 40-50% compared to conventional SAP operations based on only sulfur burning.

heat recovery with the use of sulfur as fuel and $CO_2$ capturing is estimated to recover 70-80% of the energy compared to the energy recovered in convention SAP operations based on only sulfur burning.

CaO produced from phosphogypsum calcination with sulfur as fuel will reduce the $CO_2$ emission by 70-80% compared to the use of limestone and hydrocarbon fuel for producing CaO in conventional clinker plant.

References

[1] *Reductive Decomposition of Gypsum by Carbon Monoxide*, Thomas D. Wheelock, D.R. Boylan, Chemical and Biological Engineering Publications, Iowa State University, 960.

[2] *Decomposition of Calcium Sulfate: A Review of Literature*, W.M. Swift, A.F. Panek, G.W. Smith, G.J. Vogel and A. A. Jonke, Chemical Engineering Division, Argonne National Laboratory, Illinois, USA.

[3] *Effect of Temperature on the Carbonation Reaction of CaO with CO2* Zhen-shan Li, Fan Fang, Xiao-yu Tang, and Ning-sheng Cai, ACS publication, dx.doi.org/10.1021/ef201543n, Energy Fuels 2012, 26, 2473-2482.

[4] *Experimental investigation of a circulating fluidized-bed reactor to capture CO2 with CaO*, N. Rodriguez, M. Alonso, J. C. Abanades, Environmental and Energy Engineering, First published: 12 Apr. 2011, https://doi.org/10.1002/aic.12337.

[5] *Experimental research and modeling of multiple carbonation/calcination cycle of Ca-based CO2 sorbents*. Research gate, May 2009, F. Fang, Z.-S. Li, NingshengCai.

What is claimed is:

1. An integrated method to capture polluted $CO_2$ with CaO produced from phosphogypsum calcination using sulfur as non-$CO_2$ fuel, comprising the steps of:

(a) flowing exhaust gases in counter current first to a phosphogypsum calcination plant and second to a drying plant where phosphogypsum is fed from dry stack, as described in reactions (i), (ii), (iii), and (iv):

(i) sulfur burning: $S+O_2=SO_2$ at an approximate temperature range of approximately 1100 to 1400° C.;

(ii) $CaSO_4$ calcination: $2CaSO_4+C+heat=2CaO+2SO_2+CO_2$;

where the reaction is carried out at an approximate temperature range of 1100 to 1400° C.;

(iii) pre-calcination of PG: $CaSO_4.2H_2O+heat=CaSO_4+2H_2O(v)$;

where the reaction is carried out at an approximate temperature range of approximately 650 to 950° C.;

(iv) drying of free moisture: $H_2O(l)+heat=H_2O(v)$;

where the reaction is carried out at an approximate temperature range of approximately 350 to 650° C.;

(b) treating a $SO_2$-rich stream flowing from the phosphogypsum drying plant in a plant using limited $Ca(OH)_2$ washing, as described in reactions (v) and (vi):

(v) $2Ca(OH)_2+2SO_2+O_2=2CaSO_4+H_2O+heat$;

(vi) $Ca(OH)_2+2CO=CaCO_3+C+H_2O+heat$;

where cooling is applied to carry out reactions (v) and (vi) at an approximate temperature range of 350 to 400° C.; and feeding to a waste gas sulfuric acid plant;

(c) concentrating $SO_2$-rich gas to a range of approximately 13 to 25% from the use of sulfur in the calcination plant with a reducing agent comprising C, and $SO_2$ generated from PG calcination to a conventional sulfuric acid plant prior to the $SO_2$ to $SO_3$ conversion stage, where the $SO_2$ is generated as described in reactions (vii) and (viii);

(vii) sulfur burning: $S+O_2=SO_2$ carried out at a temperature range of approximately 1100-1400° C.;

(viii) $CaSO_4$ calcination: $2CaSO_4+C+heat=2CaO+2SO_2+CO_2$; where the reaction is carried out at a temperature range of approximately 1200 to 1400° C.;

(d) sulfuric acid production in conventional SAP is carried as well defined in the reactions (ix) and (x):

(ix) $2SO_2+O_2=2SO_3+heat$;

where the reaction is carried out at an approximate temperature range of 350 to 500° C.;

(x) $SO_3+H_2O=H_2SO_4+heat$;

where the reaction is conducted at an approximate temperature range of approximately 75 to 165° C.;

(e) utilizing sulfuric acid produced in the waste gas sulfuric acid plant for digesting phosphate rock to obtain phosphoric acid and byproduct phosphogypsum;

(f) stacking phosphogypsum for the drying plant;

(g) reacting CaO powder produced in the calcination plant with $CO_2$ in a circular fluid bed reactor to obtain $CaCO_3$, as described in reactions (xi):

(xi) $CaO+CO_2=CaCO_3+heat$;

where reaction is carried out at a temperature below approximately 650° C.;

(h) where the $CO_2$ from step (f) is produced by acidic fumes from a source selected from the group consisting of a phosphoric acid plant, hydrocarbon fuel combustion, and hydrogen reformers;

(i) Utilizing CaO powder to precipitate acid fumes from phosphogypsum calcination, as described in reactions (xii), (xiii), and (xiv):

(xii) $CaO + H_3PO_4 = CaHPO_4 + H_2O$;

(xiii) $CaO + 2HF = CaF_2 + H_2O$;

(xiv) $CaO + H_2SiF_6 = CaSiF_6 + H_2O$.

2. The integrated method of claim 1, where the phosphogypsum is fed from dry stack at moisture level of 10 to 40%.

3. The integrated method of claim 1, where the byproduct phosphogypsum is fed directly for the drying plant.

4. The integrated method of claim 1, where reaction (ii) is carried out in the presence of a reducing agent at an approximate temperature range of 1100 to 1300° C. utilizing the heat generated by reaction (i).

5. The integrated method of claim 1, where removal of crystalline and free water in (iii) and (iv), respectively, is carried out at an approximate temperature range of approximately 700 to 900° C. with waste heat from $SO_2$ flues gases from reactions (i) and (ii).

6. The integrated method of claim 1, where removal of crystalline water in (iii) is utilized for cooling the $SO_2$ flue gases below approximately 700° C.

7. The integrated method of claim 1, where $SO_2$ flue gases shall be cooled and dried to approximately 400° C.

8. The integrated method of claim 1, where reaction (iv) is carried out at an approximate temperature range of 400-600° C.

9. The integrated method of claim 1, where $SO_2$-rich gas produced from reactions (i) and (ii) are concentrated to a range of approximately 16-20%.

10. The integrated method of claim 1, where the reducing agent is a carbon source selected from the group consisting of coal, heavy fuel oil, crude oil, carbon mono-oxide and natural gas.

11. The integrated method of claim 1, where reaction (xi) is carried out at a temperature below approximately 500° C.

12. The integrated method of claim 1, where the $CaCO_3$ produced by reaction (xi) contains neutralized impurities coming originally from phosphogypsum and acidic fumes from polluted $CO_2$.

13. The integrated method of claim 12, where the impurities are selected from the group consisting of;
$CaSO_4$, CaF2, $CaHPO_4$ and $CaSiF_6$.

14. The integrated method of claim 1, where sulfur is used as fuel for phosphogypsum calcination to produce sulfuric acid and lime to capture $CO_2$ and produce limestone.

15. The integrated method of claim 14, where approximately 75% excess energy is recovered, compared to the energy recovered from sulfur burning in a conventional sulfuric acid plant.

16. The integrated method of claim 14, where the use of sulfur as fuel to calcine phosphogypsum allows the production of approximately 6 tons of sulfuric acid for every ton of sulfur.

17. The integrated method of claim 14, where CaO produced from the calcination of phosphogypsum can be used in the production of low-$CO_2$ clinker.

18. The integrated method of claim 17, where the CaO utilized to produce low-$CO_2$ clinker saves approximately 40-50% of the total energy required to produce clinker from phosphogypsum when sulfur is used as fuel compared to using only using hydrocarbon fuel.

19. The integrated method of claim 17, where CaO utilized to produce low-$CO_2$ clinker reduces clinker production's net $CO_2$ emissions by approximately 75% compared to conventional limestone-based clinker production.

20. The integrated method of claim 1, where the total consumption of sulfur in a waste gas sulfuric acid plant is reduced to below approximately 50% than the consumption of sulfur in a conventional sulfuric acid plant based on sulfur burning.

* * * * *